Jan. 16, 1962  J. F. BROWN, JR., ETAL  3,017,386
BENZENE SOLUBLE PHENYL SILSESQUIOXANES
Filed Jan. 21, 1959
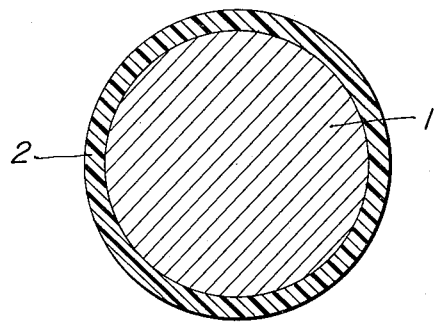
Inventors:
John F. Brown, Jr.;
Lester H. Vogt, Jr.,
by Joseph T. Cohen
Their Attorney.

United States Patent Office 3,017,386
Patented Jan. 16, 1962

3,017,386
BENZENE SOLUBLE PHENYL
SILSESQUIOXANES
John F. Brown, Jr., and Lester H. Vogt, Jr., Schenectady, N.Y., assignors to General Electric Company, a corporation of New York
Filed Jan. 21, 1959, Ser. No. 788,069
25 Claims. (Cl. 260—46.5)

This invention relates to novel organopolysiloxanes. More particularly, the invention is concerned with soluble organopolysiloxanes containing an average of from 1.0 to 1.1 silicon-bonded organic groups per silicon atom and composed of from 90 to 100 mol percent of organosiloxy units of the formula $RSiO_{3/2}$ and having an intrinsic viscosity in benzene at 25° C. of at least 0.4 deciliter per gram (hereinafter referred to only by the intrinsic viscosity numerical value), any remaining organosiloxy units of the organopolysiloxane being selected from the class consisting of organosiloxy groups of the formula and $$R'R''SiO, \quad R'(CN-[CH_2]_m)SiO, R'''SiO_{3/2}$$

and $$CN(CH_2)_m SiO_{3/2}$$

groups where R is an aryl radical (e.g., phenyl, cyanophenyl, benzoylphenyl, tolyl, xylyl, ethylphenyl, naphthyl, biphenyl, anthracyl, phenoxyphenyl, tolyloxyphenyl radicals, etc.); R' and R'' are selected from the class consisting of aryl radicals (many examples of which have been given above), alkyl radicals (e.g., methyl, ethyl, propyl, isopropyl, butyl, cyclopentyl, cyclohexyl, etc., radicals); and alkenyl radicals (e.g., vinyl, allyl, methallyl, cyclohexenyl, etc. radicals); R''' is a lower alkyl radical of from 1 to 4 carbon atoms, for instance, methyl, ethyl, propyl, butyl, etc., radicals; and $m$ is a whole number equal to from 2 to 4. Mixtures of these radicals are also contemplated.

The above-described intrinsic viscosity (identified by the symbol "$|\eta|$") referred to herein as a measurement of the molecular weight of the polymers of our invention was determined as follows. The viscometer used was a modified Ubbelohde viscometer in which in place of the straight capillary tube between the second bulb and the reservoir, a coil of two turns of capillary tubing was substituted. The dimensions of the capillaries were (a) 2 mm. diameter between first and second bulbs and (b) 0.5 mm. diameter for coiled capillary (inside diameter of coils about 1"). The intrinsic viscosity was carried out in a constant temperature water bath maintained at about 25° C.

The actual determination of the intrinsic viscosity involved drying of 0.1 gram of the polymer whose intrinsic viscosity was to be determined, in vacuum at 110° C. for three hours and then weighing the sample. A volume (in milliliters) of reagent grade benzene was added equal to the weight of the polymer (in grams) multiplied by 100. When all the polymer had dissolved, a small test tube was filled with the solution, corked and centrifuged to settle out any foreign matter that might be present. A 5 ml. aliquot portion was removed from the test tube and transferred to the viscometer placed in a 25° C. constant temperature water bath. The bulbs of the viscometer were filled with the solution and the time in seconds for the solution to fall from the first to the second graduation was recorded. Several dilutions were made by adding known volumes of benzene to the reservoir bulb, mixing thoroughly, and then repeating the procedure. The number of seconds required for the solvent to pass through the first and second graduations was checked periodically. The intrinsic viscosity was determined by plotting the specific viscosity divided by the concentration against the concentration in grams of polymer per hundred ml. of benzene and extrapolating the curve to C (concentration) equal to 0. The following are the formulas which were used in determining the intrinsic viscosity.

$$\eta \text{ relative} = \frac{\text{number of seconds for solution}}{\text{number of seconds for solvent}}$$

$\eta$ specific = $\eta$ relative $-1$

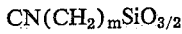

$$\eta \frac{\text{specific}}{C} = \frac{\eta \text{ specific}}{\text{grams polymer per 100 ml. solvent}}$$

$$|\eta| \text{ (intrinsic)} = \frac{\eta \text{ specific}}{C} \text{ as } C \to 0.$$

When a phenyltrihydrolyzable silane, such as phenyltrichlorosilane, is hydrolyzed with water, a vigorous reaction sets in with rapid replacement of the silicon-bonded chlorine atoms with Si—OH groups and concurrent condensation of the silanol groups to give crosslinked resins or gels. When this hydrolysis is carried out in a solvent such as toluene, diethyl ether, etc., some diminution in the degree of gelation may be obtained. However, this dilution limits the degree of polymerization by favoring increased cyclization and less complete hydroxyl condensation so that when carried out in solvents of this type, the hydrolysis of, for instance, phenyltrichlorosilane, will give very low molecular weight polysiloxanes. Attempts in the past have been made to obtain soluble (e.g., in benzene) higher molecular weight polysiloxanes from a phenyltrihydrolyzable silane but these have not met with success. For the most part, although such efforts have resulted in somewhat increased molecular weight, still the molecular weight of the phenylpolysiloxane thus obtained has been limited by the tendency of the phenylsiloxy groups to cyclicize to give cage-like structures, examples of which may be found in Barry et al. Patent 2,465,188 issued March 22, 1949 (which deals solely with alkyl silsesquioxanes).

Attempts to apply the techniques used in making alkyl silsesquioxanes to making phenyl silsesquioxanes have generally not proved to be satisfactory. For example, in an article by Barry et al in Journal of American Chemical Society, vol. 77, page 4248 (1955), it is pointed out that attempts to prepare phenyl silsesquioxanes by a thermal, alkali-catalyzed process failed even though the same process employed was successful in the preparation of, for instance, alkyl silsesquioxanes. The procedures employed by Barry and his coworkers for making low molecular weight crystalline phenyl silsesquioxanes containing approximately 6 units of the formula $C_6H_5SiO_{3/2}$ comprised heating a dilute phenyltrichlorosilane hydrolyzate solution at around room temperature with potassium hydroxide to obtain the above-described low molecular weight hexameric derivative of the phenyl silsesquioxane.

It has also been suggested in U.S. 2,482,276—Hyde et. al., that non-gelled, thermoplastic siloxane resins can be prepared by heating an organopolysiloxane in an inert solvent in the presence of an alkali-metal hydroxide or other alkaline and lead salts used to polymerize organopolysiloxanes. According to this patent, the maximum weight concentration of the organopolysiloxane in the solution in cases where the degree of substitution of the siloxane is around 1.0, is in the neighborhood of 29 to 30%, and even where the degree of substitution is of the order of 1.1, the weight concentration of the siloxane based on the weight of the solution is at most about 38%. It has been found that if the hydrolyzate of a phenyltrihydrolyzable silane which has a ratio of one phenyl radical per silicon atom is treated in accordance with the disclosures and teachings in the Hyde et al. patent, the intrinsic viscosities of such compositions are well below 0.1 and have little utility per se. Furthermore, it is apparent from the description in this patent that the products obtained are all thermoplastic and are fusible at elevated temperatures.

Contrary to what might have been expected from the efforts of prior workers, we have discovered that we are able to obtain aryl polysiloxane polymers of the above type having intrinsic viscosities of 0.4 and higher, e.g., as high as 5.5 or more, by employing a certain set of ingredients under certain conditions. In accordance with our invention, an organopolysiloxane composed of at least 90 mol percent monoaryl siloxy units of the type recited above, the balance of the siloxy units being selected from the class of organosiloxy units previously described, is heated with a solvent in a critical solvent concentration range at elevated temperatures in the presence of an alkaline rearrangement agent.

Unexpectedly, it has been found that when one employs in combination with the monoarylsiloxy units, a siloxy unit containing three silicon-bonded organic groups, for instance, a trimethylsiloxy unit, in the final heat-treatment stage in the presence of the alkaline rearrangement catalyst, no polymer could be obtained which had intercondensed trimethylsiloxy units. It was also surprising to find that when one employed with the monoarylsiloxane either a diarylsiloxane or a siloxane containing from 1 to 2 lower alkyl radicals or cyanoalkyl radicals, as the molar concentration of the latter groups approached 10 mol percent, the intrinsic viscosity of the final polymer fell below 0.4 and in no event could higher intrinsic viscosities be obtained.

The method whereby our claimed compositions of matter having intrinsic viscosities of 0.4 or higher can be prepared depends on two critical steps. In the first place, it is necessary to make what will hereinafter be referred to as a "prepolymer" (which may be a homopolymer or a copolymer and which preferably, though not essentially, is free of silicon-bonded hydroxyl groups, several ways of preparing these prepolymers being more specifically described and referred to hereafter). Thereafter, this prepolymer (or precopolymer if the organopolysiloxane contains more than one type of organosiloxy unit) is heated at elevated temperatures in the presence of the solvent and of an alkaline rearrangement catalyst.

Several methods may be employed in making these prepolymers (which for brevity is intended to include hereafter precopolymers). Thus, in the preparation of, for instance, the prepolymer from an aryltrihydrolyzable silane, for instance phenyltrichlorosilane, one method comprises hydrolyzing the latter with water in an amount sufficient to effect complete hyldrolysis of the silicon-bonded hydrolyzable groups, advantageously employing a solvent such as benzene, toluene, xylene, diethyl ether, etc., as a diluent for the hydrolysis medium. The acid layer is removed and the resin layer (washed free of acid), which is advantageously in the form of an aromatic hydrocarbon solution, is treated, for instance, by azeotropic distillation, to remove any of the residual water and HCl.

When preparing precopolymers (used to make our compositions) composed of at least 90 mol percent of monophenylsiloxy units with either diphenylsiloxy units or siloxy units containing from 1 to 2 organic groups selected from the class consisting of alkyl, alkenyl, and cyanoalkyl radicals within the range of 10 mol percent or less, there are several means for accomplishing this. One method comprises cohydrolyzing an aryltrihydrolyzable silane with the requisite molar amount of either a diaryldihydrolyzable silane or a hydrolyzable silane of the formula $$Z_m SiY_{4-m}$$

where Z is a lower alkyl radical, alkenyl radical, or cyanoalkyl radical of from 2 to 4 carbon atoms (exclusive of the —CN radical), and Y is a hydrolyzable group, for example, halogen (e.g., chlorine, bromine, etc.), an organoxy radical (e.g., ethoxy, aryloxy, etc., radical), acyloxy, etc., and $m$ is an integer from 1 to 2, inclusive.

When making copolymers for the prepolymer stage by the cohydrolysis of the aryltrihydrolyzable silane with the one or more cohydrolyzable silanes conforming to the above-described organic types and number of substitution on the silicon, the conditions for hydrolysis are generally well known in the art and of course include the use of an amount of water sufficient to effect complete hydrolysis of all silicon-bonded hydrolyzable groups. The use of inert solvents in carrying out this hydrolysis, for instance, benzene, toluene, xylene, etc., is shown in such United States patents as, e.g., 2,504,839—Hyde; 2,456,627—Doyle; 2,470,497—Lamoreaux; and 2,383,827—Sprung.

Instead of effecting cohydrolysis of the aryltrihydrolyzable silane in combination with the other hydrolyzable silanes, one can effect interpolymerization between the aryl prepolymer obtained from the aryltrihydrolyzable silane with organopolysiloxanes already having the other desired organic groups, i.e., diaryl siloxanes, siloxanes containing from 1 to 2 lower alkyl or cyanoalkyl radicals on each silicon atom, etc. For instance, the prepolymer from the phenyltrihydrolyzable silane can be interacted under heat with octamethylcyclotetrasiloxane, octaphenylcyclotetrasiloxane, tetramethyltetraphenylcyclotetrasiloxane, or with tetramethyltetracyanoalkylcyclotetrasiloxane, for instance, tetramethyltetra(beta-cyanoethyl)cyclotetrasiloxane, in the presence of a suitable solvent, such as toluene, employing an alkaline rearrangement catalyst, for effecting interpolymerization. The heating is advantageously carried out to a point where the reaction product is substantially free of silicon-bonded hydroxyl groups. This stage is desirable not only when making the precopolymers but also when making the prepolymers with the aryl trihydrolyzable silanes, for instance, the prepolymer derived from the hydrolyzate of phenyltrichlorosilane.

As specific examples of monomeric silanes which can be hydrolyzed and cohydrolyzed and polymeric siloxanes which can be copolymerized in order to make the prepolymers which are subsequently treated at elevated temperatures in the presence of the rearrangement catalyst in the requisite solvent at the concentration required to obtain polymers with intrinsic viscosities within the scope of our invention, one can mention as the monomeric silanes, for instance, phenyltrichlorosilane; biphenyltrichlorosilane; naphthyltriethoxysilane; tolyltriacetoxysilane; anthracyl trichlorosilane, etc.

Among the cohydrolyzates which may be prepared in accordance with the above general instructions may be mentioned, for instance, the cohydrolysis of phenyltrichorosilane and diphenyldichlorosilane; the cohydrolysis of phenyltrichlorosilane and methyltrichlorosilane; the cohydrolysis of phenyltrichlorosilane and beta-cyanoethyltrichlorosilane; the cohydrolysis of phenyltrichlorosilane and dimethyldichlorosilane; the cohydrolysis of phenyltrichlorosilane and methyl beta-cyanoethyldichlorosilane; the cohydrolysis of biphenyltriethoxysilane and diphenyldiethoxysilane; the cohydrolysis of naphthyltrichlorosilane and dimethyldichlorosilane; cohydrolysis of phenyltriethoxysilane and isopropyltriethoxysilane; cohydrolysis of phenyltriethoxysilane and methyl vinyldiethoxysilane; etc. The use of ternary cohydrolysis reactants is not precluded, as for instance a ternary mixture of phenyltrichlorosilane, methyltrichlorosilane, and beta-cyanoethyl methyldichlorosilane; phenyltrichlorosilane, dimethyldichlorosilane and methyl phenyldichlorosilane, etc. It should, of course, be understood that when effecting cohydrolysis of two or more cohydrolyzable ingredients including the monoaryltrihydrolyzable silane, the hydrolyzable silanes other than the latter monoaryltrihydrolyzable silane should be present in molar concentrations of 10 mol percent or less of the total molar concentration of all the hydrolyzable silanes.

Included among the organopolysiloxanes which can be used in making copolymerized prepolymers can be mentioned, for instance, the monoarylpolysiloxanes in combination with one or more of the following, for instance, octaphenylcyclotetrasiloxane, octamethylcyclotetrasiloxane, tetramethyltetraphenylcyclotetrasiloxane, octaethylcyclotetrasiloxane, decamethylcyclopentasiloxane, the hydrolyzate of methyltrichlorosilane, tetramethyl tetra-(beta-cyanoethyl)cyclotetrasiloxane, tetramethyltetravinylcyclotetrasiloxane, etc. It will again be understood that in effecting copolymerization of the siloxanes, there will be employed for co-reaction with the hydrolyzate of the aryltrihydrolyzable silane, molar quantities of the other organosiloxane or siloxanes which do not exceed 10 mol percent of the total molar concentration of the ingredients.

For interpolymerization of the organopolysiloxanes described immediately above, one can employ from about 0.001 to about 0.1%, by weight, based on the weight of the organopolysiloxane undergoing treatment, of an alkaline rearrangement catalyst, for instance, potassium hydroxide, cesium hydroxide, tetramethyl ammonium hydroxide, tetrabutyl phosphonium hydroxide, etc. The temperature at which the interaction for making the prepolymer is carried out may vary from about 75 to 175° C., for times of the order of from about 10 minutes to about 20 hours or more. Generally, the heating is continued until the prepolymer is substantially free of silicon-bonded hydroxyl groups. Solvents are advantageously employed in this copolymerization reaction. It should be noted that if the molar concentrations of organosiloxy units, other than the monoarylsiloxy unit, approach or exceed 10 mol percent, in the final polymer prepared in accordance with our invention, the intrinsic viscosity will generally fall below 0.4.

The preparation of the organopolysiloxane compositions of the instant invention are obtained by mixing the prepolymer, more particularly described above, with a suitable solvent in a specific critical solids concentration, and heating it at the requisite temperature and in the presence of an alkaline rearrangement catalyst for a time sufficient to attain intrinsic viscosities of at least 0.4 and higher. The most critical feature of our invention (by which we are able to obtain the organopolysiloxanes of intrinsic viscosity of 0.4 and higher) involves employing a solvent in such an amount that in the phase undergoing reaction, the prepolymer comprises on a weight basis at least 70 percent of the total weight of the prepolymer and the solvent employed. In general, the phase undergoing reaction, i.e., the polymerizing prepolymer, can be regarded as being composed of mostly the prepolymer with the solvent acting as a plasticizer, whereby in this phase the concentration relationship of solvent and prepolymer is that recited above. Among the solvents which may be employed in the practice of the invention are, for instance, diphenyl, diphenyl oxide, mixtures of the latter two ingredients (e.g., Dowtherm A, sold by Dow Chemical Co., Midland, Michigan), methyl phenyl ether, ethyl phenyl ether, cyclohexane, benzonitrile, mesitylene, durene, metadimethoxybenzene, etc.

The temperature at which the prepolymer is heated to convert it to the higher intrinsic viscosity state (hereinafter called the "polymer") may vary from about 200° to 325° C., and advantageously within the range of from about 225° to 275° C. The rearrangement catalysts used include some of those employed in making the prepolymers, i.e., the alkali-metal hydroxides, alkali-metal silanolates, for instances, the potassium salt of methylsilanetriol, the potassium salt of phenylsilanetriol, either alone or in the form of an alcoholic, for instance, methanol solution. The amount of alkaline rearrangement catalyst used in converting the prepolymer to the higher intrinsic viscosity compositions may be varied widely, but advantageously is within the range of from about 0.02 to about 0.5%, by weight, based on the weight of the prepolymer undergoing treatment. The reaction may be carried out at normal or superatmospheric pressures. Elevated pressures can be used if the boiling point of the solvent is below the temperature of reaction. The time of heating may be varied widely and will depend upon such factors as, e.g., the prepolymer undergoing reaction, catalyst, catalyst concentration, solvent, solvent concentration, etc. Generally, times of the order of about 1 to 8 hours are sufficient for obtaining the desired intrinsic viscosity. More careful control must be exercised in the case of the prepolymer containing silanol groups than in the case where the prepolymer is free of silanol groups in order to avoid gelation and to obtain the desired intrinsic viscosity.

We have also found that we are able to obtain soluble organopolysiloxanes of intrinsic voscosity of 0.4 or higher by heating prepolymers of intrinsic viscosity of from 0.1 to 0.3 [which polymers are more particularly disclosed and claimed in the copending application of Murray M. Sprung and Frederick O. Guenther, Serial No. 788,068, filed concurrently with and assigned to the same assignee as the present invention], at temperatures of about 300° to 350° C. in the absence of a rearrangement catalyst for long periods of time, for instance, for about 300 to 400 hours. However, such treatment will not give very high intrinsic viscosity but nevertheless in one instance we have been able to heat a prepolymer of intrinsic viscosity of 0.18 under such conditions so as to obtain a polymer having an intrinsic viscosity of 0.51. The preferred method of treatment of the prepolymers is to carry out the final reaction in the presence of an alkaline rearrangement catalyst at elevated temperatures in the presence of a suitable solvent, employing the critical solvent concentration conditions heretofore described.

Although we do not wish to be restricted to any theoretical considerations, it is believed that the polymers obtained in accordance with the practice of our invention are generally of a linear nature, which would account for their soluble characteristics. Flow birefringence and light scattering data point to a large randomly coiled linear molecule. The birefringence is somewhat similar to that of polystyrene, indicating that the planes of the aryl groups are probably perpendicular to the chain. Infrared data point to the presence of linear polysiloxane chains and unstrained cyclotetrasiloxane rings. From this data it is believed that the polymers are composed of a large number of linearly arranged siloxy units of the formula

where R is an aryl radical, many examples of which have been given above and $n$ is a whole number greater than 50, and may be as high as several hundred to several thousand or more.

In order that those skilled in the art may better understand how the present invention may be practiced, the following examples are given by way of illustration and not by way of limitation. All parts are by weight.

EXAMPLE 1

A prepolymer derived from phenyltrichlorosilane was prepared as follows. About 1058 parts phenyltrichlorosilane was dissolved in 1416 parts diethyl ether. This solution was placed in a reaction flask cooled by a cold water bath. The solution was stirred while 540 parts water was introduced slowly at a rate such that the temperature in the reaction mixture did not exceed 25° C. The hydrolyzate was then washed with water until neutral and thereafter heated over a steam bath to remove the diethyl ether. When the hydrolyzate became syrupy, about 1300–1800 parts benzene was added and a Dean Stark trap was attached and the solution refluxed until water ceased to come over. This azeotropic distillation removed essentially all of the water. The distillation was continued to remove benzene until a solution was obtained which contained about 47.6%, by weight, of a prepolymer of monophenylsiloxane containing some residual silanol groups. To about 105 parts of the hydrolyzate solution was added 13 parts of a mixture of diphenyl and diphenyl ether (the mixture being in a weight ratio of 26.5% to 73.5%) and about 0.05 part KOH in the form of a solution in methanol. After thorough mixing, the ingredients were heated to about 250° C. thereby removing the methanol, water and benzene. Thereafter, the vessel in which the heating was proceeding was loosely stoppered, and heating continued at 250° C., for about one hour. The reaction mixture was allowed to cool to give a white solid, which was dissolved with slight warming in benzene and the benzene solution treated with a small amount of acetic acid to neutralize the catalyst employed in the reaction. The solution was filtered and then poured slowly into a sufficient amount of methanol to precipitate the desired polymer which was obtained in the form of long white fibers. These fibers were filtered, washed with methanol, air dried, and then dried for three hours at 100° C. in a vacuum. Evaluation of this polymer revealed that it had an intrinsic viscosity in benzene of 4.0 (when measured in the manner described above), and the molecular weight was about 4.1 million by light scattering methods. Analysis of the polymer showed that it had the following:

Carbon=55.5% and hydrogen=4.0% as contrasted to the theoretical for a polymer of the formula $$(C_6H_5SiO_{1.5})_x$$

where $x$ is an integer greater than 1, of carbon=55.8% and hydrogen=3.9%. This polymer could be heated in a vacuum until red without charring. Even when heated in air, the polymer could be heated to a red glow before any charring occurred. Films were cast from benzene solutions and such films were transparent, quite flexible, and had good tensile strength.

EXAMPLE 2

This example illustrates the criticality of using the proper concentration of solvent with the prepolymer. More particularly, the phenylpolysiloxane prepolymer obtained in Example 1 was heated with various concentrations of a solvent mixture composed, by weight, of 26.5 percent diphenyl and 73.5 percent diphenyl oxide. The concentration of the phenylpolysiloxane prepolymer was varied while the mixture of ingredients was heated in each instance for 2 hours at 250° C. in the presence of the same small amount of potassium hydroxide, similarly as was done in Example 1. The final polymer composition thus obtained was isolated in the same manner as in Example 1 and the intrinsic viscosity of each polymer determined. The following Table I shows the relationship of the concentration of the solvent to the intrinsic viscosity of the final polymeric composition:

Table I

| Sample No. | Approximate¹ weight percent solvent in mixture | Intrinsic viscosity of polymer |
| --- | --- | --- |
| 1 | 0 | 0.03 |
| 2 | 6 | 0.7 |
| 3 | 11.5 | 2.75 |
| 4 | 20.6 | 4.00 |
| 5 | 26.0 | 2.1 |
| 6 | 30.5 | 0.21 |
| 7 | 86.5 | 0.04 |

¹ Based on total weight of solution being heated.

EXAMPLE 3

A phenyl prepolymer was heated similarly as in Example 1 using the previously described solvent mixture of diphenyl and diphenyl oxide to obtain a composition having an intrinsic viscosity of 3.25. Films deposited from a benzene solution were flexible and could be creased without cracking. This film showed a tensile strength of about 5500 p.s.i. and a dielectric strength of 6.02 kv./mil. We have found that compositions similar to the above having an intrinsic viscosity of 2.00 had a tensile strength at room temperature of about 3400 p.s.i. and at 250° C. had a tensile strength of about 1090 p.si. with an elongation of about 12%.

In the following examples, prepolymers composed essentially of monophenylsiloxy units of the formula $$C_6H_5SiO_{1.5}$$

were interpolymerized with other organosiloxy units by heating the mixture of ingredients in the presence of various solvents. The phenylpolysiloxane prepolymer used for copolymerization purposes was prepared differently from Example 1 and is specifically described in Example 4. This prepolymer already contained 0.078%, by weight, KOH. The precopolymers thus obtained were subjected to thermal treatment in the presence of small amounts of KOH similarly as was done in the previous examples.

EXAMPLE 4

PREPARATION OF SILANOL-FREE PHENYL PREPOLYMER

About 500 parts phenyltrichlorosilane, dissolved in 500 parts toluene, were added slowly with stirring to 2000 parts water. The acid layer was separated and the resin layer in the form of a toluene solution was subjected to azeotropic distillation to remove residual water and HCl. Thereafter, about 0.078%, by weight, KOH based on the weight of the calculated hydroxyl-free phenylpolysiloxane was added, and the toluene solution was refluxed with stirring for about 9 hours to give a silanol-free phenyl prepolymer. The resulting syrupy phenylpolysiloxane prepolymer comprising about 50.3%, by weight of the toluene solution, was composed of recurring units of the formula $$C_6H_5SiO_{1.5}$$

Separation of the solid phenyl prepolymer was accomplished by diluting the above toluene solution of the phenylpolysiloxane prepolymer with about 1.5 times the weight thereof of mineral spirits (Stoddard solvent boiling approximately within the range of 156–196° C., approximate K.B. value 37). The resultant slurry was agitated strongly for about 10 minutes and then vacuum filtered, giving a solid product which was air-dried for about 16 hours and then for 4 hours in a 150° C. oven.

EXAMPLE 5

PREPARATION OF PHENYL PRECOPOLYMERS

Method A.—The phenyl prepolymer prepared in Example 4, in one case with octamethylcyclotetrasiloxane, and in another case with octaphenylcyclotetrasiloxane, was placed in a reaction vessel to which about 173 parts toluene were added. Sufficient aqueous potassium hydroxide solution was added to bring the total concentration of potassium hydroxide in the system to 0.078%, by weight, based on the total weight of the phenyl prepolymer and the cyclic polysiloxane. A reflux condenser and Dean Stark trap were attached to the reaction vessel and the mixture was heated at the reflux temperature of the mass for 19 hours to give an hydroxyl-free polymer. The reaction vessel was cooled to room temperature and the low molecular weight polymer [believed to be a polymer having the formula $(C_6H_5SiO_{1.5})_8$] which precipitated was removed by filtration, and the filtrate was then heated to remove toluene until the solution became somewhat syrupy; this syrupy mixture was evaporated to dryness at 150° C. in a vacuum for about 1 to 2 hours. The product thus obtained was ground to a fine powder and was an organopolysiloxane composed of monophenylsiloxy units and either dimethylsiloxy units or diphenylsiloxy units. Table II in Example 6 recites the molar concentrations and weight of ingredients used to make the precopolymer by this method.

*Method B.*—In this method, phenyltrichlorosilane and methyltrichlorosilane were cohydrolyzed by adding a solution of the phenyltrichlorosilane and methyltrichlorosilane in toluene (employing the toluene in about the same weight ratio as in Method A) to a slurry of crushed ice and water, with rapid stirring, to maintain the temperature at around 0° C. After all the chlorosilanes had been added, stirring was continued until the temperature of the mixture rose to room temperature. The water was removed and the toluene-hydrolyzate solution was heated to remove the remaining water and hydrogen chloride. The solution was then treated with 0.078 weight percent potassium hydroxide and further processed in the same manner as was done in Method A. Table III in Example 6 gives the molar concentrations and weight of ingredients used in making the precopolymer by this method.

EXAMPLE 6

The following procedure was employed to equilibrate thermally the precopolymers described in Example 5. More specifically, about 5 parts of the precopolymer was placed in a reaction vessel capable of being sealed off from the atmosphere, phenyl ethyl ether added and mixed thoroughly with the precopolymer. The reaction vessel was evacuated (to 0.1 mm. Hg) and then sealed, and placed in an oven at 250° C. for about 2 hours. After cooling the reaction vessel to room temperature, the contents were removed and placed in an open vessel containing about 659 parts benzene and a small amount of acetic acid added in order to neutralize the residual KOH remaining in the reaction mixture. When solution was complete, the liquid thus obtained was filtered and the filtrate was poured slowly with stirring into a large amount (about 10 times the volume of the liquid) of methanol to precipitate the formed polymer. The polymer thus obtained was filtered, washed several times with methyl alcohol, air-dried, and then dried for 3 hours at 110° C. in an oven.

Table IV shows the molar concentrations of the organosiloxy units other than the monophenylsiloxy units, together with the variation in intrinsic viscosity obtained by varying the concentrations of the phenyl ethyl ether. The precopolymer containing both monophenylsiloxy units and either the dimethylsiloxy unit or diphenylsiloxy unit, was prepared by means of Method A, while the precopolymer containing both monophenylsiloxy units and monomethylsiloxy units was prepared by means of the cohydrolysis reaction described in Method B. It should be noted that Table IV also includes a terpolymer (prepared by Method A) composed of monophenylsiloxy units, diphenylsiloxy units, and dimethylsiloxy units. We have found that during the processing steps leading from the preparation of the precopolymer to the final compositions of our invention, there may occur some modification of the molar concentrations of the organosiloxy units intercondensed with the monoarylsiloxy units due to small loss of organosiloxy units thus altering somewhat the molar ratio of the groups but still leaving them within the ranges previously recited.

*Table II*

| Sample No. | 8 | 9 | 10 | 11 | 12 | 13 | 14 |
|---|---|---|---|---|---|---|---|
| Mol percent: | | | | | | | |
| $C_6H_5SiO_{3/2}$ | 99.9 | 98 | 90 | 80 | 98 | 90 | 89.9 |
| $(C_6H_5)_2SiO$ | 0.1 | 2 | 10 | 20 | | | |
| $(CH_3)_2SiO$ | | | | | 2 | 10 | 10.0 |
| $(C_6H_5SiO)_2$ | | | | | | | 0.1 |
| Parts reactants used: | | | | | | | |
| Monophenyl[1] prepolymer | 32.3 | 31.7 | 29.1 | 25.8 | 31.7 | 29.1 | 29.0 |
| Diphenyl[2] polymer | 0.05 | 1.0 | 5.0 | 9.9 | | | 1.9 |
| Dimethyl[3] polymer | | | | | 0.4 | 1.9 | 0.05 |

[1] Phenyl prepolymer from Example 4.
[2] Octaphenylcyclotetrasiloxane.
[3] Octamethylcyclotetrasiloxane.

*Table III*

| Sample No. | Mol percent | | Parts reactants used | | Parts[1] toluene |
|---|---|---|---|---|---|
| | $C_6H_5SiCl_3$ | $CH_3SiCl_3$ | $C_6H_5SiCl_3$ | $CH_3SiCl_3$ | |
| 15 | 98 | 2 | 51.8 | 0.7 | 525 |
| 16 | 90 | 10 | 47.6 | 3.7 | 513 |
| 17 | 80 | 20 | 42.3 | 7.5 | 498 |
| 18 | 50 | 50 | 26.5 | 18.7 | 452 |

[1] In each instance, a slurry of ice and water equal to about 400 parts by weight were used in the cohydrolysis.

*Table IV*

| Sample No. | 8 | 9 | 10[1] | 11[1] | 12 | 13 | 14 | 15 | 16 | 17 | 18 |
|---|---|---|---|---|---|---|---|---|---|---|---|
| Mol percent: | | | | | | | | | | | |
| $(C_6H_5)_2SiO$ | 0.1 | 2.0 | 10.0 | 20.0 | | | 0.1 | | | | |
| $(CH_3)_2SiO$ | | | | | 2.0 | 10.0 | 10 | | | | |
| $CH_3SiO_{3/2}$ | | | | | | | | 2 | (2) | (2) | (2) |
| Parts phenyl ethyl ether ($\eta$):[3] | | | | | | | | | | | |
| 0.2 | 1.1 | 0.4 | | | 0.8 | 0.6 | 0.6 | 0.5 | | | |
| 0.6 | 1.5 | 0.5 | | | 1.2 | 1.0 | 0.6 | 0.6 | | | |
| 1.0 | 1.9 | 0.6 | | | 1.6 | 0.9 | 0.4 | 2.7 | | | |
| 1.4 | 1.7 | 0.5 | | | 1.6 | 0.5 | 0.3 | 2.3 | | | |
| 1.6 | 1.6 | 0.4 | | | 1.4 | | 0.1 | 2.0 | | | |

[1] Intrinsic viscosities did not exceed 0.122.
[2] Totally gelled.
[3] Per 5 parts precopolymer Analyses of the final polymers obtained in Example 6 showed that soluble polymers having intrinsic viscosities of 0.4 and higher were obtained from monophenylpolysiloxane copolymers containing approximately 4 mol percent or less diphenylsiloxy units, 7 mol precent or less dimethylsiloxy units, and 2 mol percent or less monomethylsiloxy units. All the above finally equilibrated copolymers of intrinsic viscosity of 0.4 or higher were soluble in benzene and were infusible at temperatures of from 250° to 350° C. or even higher.

EXAMPLE 7

Employing the procedures described in Example 4, biphenyltrichlorosilane or naphthyltrichlorosilane is hydrolyzed to obtain a biphenyl prepolymer or naphthyl prepolymer. This prepolymer is heated in the presence of diphenyl ether or diphenyl oxide at temperatures of from about 200 to 275° C. in the presence of small amounts of an alkaline catalyst, e.g., potassium hydroxide, to obtain thermally stable, benzene-soluble polymers of intrinsic viscosity of 0.4 and higher, in which the recurring unit is of the formula

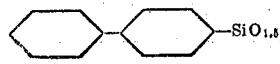

when using the biphenyl prepolymer and

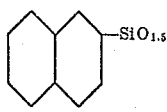

when using the naphthyl prepolymer in the thermal equilibration.

EXAMPLE 8

A solution of 100 parts of methyl beta-cyanoethyldichlorosilane (hereinafter referred to as "methyl cyanoethyldichlorosilane") in 173 parts toluene was hydrolyzed by pouring it into about 800 parts of a slurry of ice and water with rapid stirring, the toluene layer removed and washed with dilute aqueous sodium bicarbonate to neutralize any residual HCl. The aqueous solution was also neutralized as above, benzonitrile added to the aqueous solution and the benzonitrile solution drawn off, washed several times with water, and then combined with the toluene solution of the hydrolyzate. KOH in the form of an aqueous solution was added in an amount equal to 0.078 percent, by weight, based on the weight of the methyl cyanoethyldichlorosilane hydrolyzate assumed to be composed of recurring units having the formula

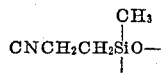

The solution was refluxed for about 19 hours with an attached Dean-Stark trap, to azeotrope out the water. The solution was filtered, placed in a 150° C. oven for 24 hours to remove solvent to yield a viscous oil which, upon examination, showed that it was substantially free of silanol groups. This methyl cyanoethylsiloxane prepolymer was added in an amount equal to 2 mol percent to 98 mol percent of the phenyl prepolymer described in Example 4, an additional amount of KOH was added as an aqueous solution to bring the total KOH concentration up to 0.078 percent, by weight, based on the total weight of the mixture of polymers (this was done because some KOH was lost in the prior reaction). A mixture of toluene and benzonitrile was added, and the mixture of ingredients heated at reflux with a Dean Stark trap for 19 hours. The solution was then heated to remove solvent and the composition was dried at 150° C. under vacuum for 15 hours to give a precopolymer composed of units of the formula $C_6H_5SiO_{1.5}$ and units of the formula

Five parts of the precopolymer was mixed with certain amounts of benzonitrile in a reaction vessel, the reaction vessel evacuated and sealed and the reaction mixture heated at 250° C. for 2 hours. After cooling the contents to room temperature, they were removed, and dissolved in about 70 parts ethylene glycol dimethyl ether together with a very small amount of acetic acid sufficient to neutralize the KOH present in the reaction mixture. The thermally equilibrated copolymer was precipitated by pouring the solution into methyl alcohol, the solid product thus obtained removed by filtration and dried 3 hours in vacuum at 150° C. Table V below shows the weights of precopolymer and benzonitrile added, as well as the intrinsic viscosity of each of the polymers thus obtained:

Table V

| Parts precopolymer | Parts benzonitrile | Intrinsic viscosity |
|---|---|---|
| 50 | 4 | 0.44 |
| 50 | 6 | 0.635 |
| 50 | 8 | 0.632 |

EXAMPLE 9

In this example, the phenyl prepolymer of Example 4 (which contained KOH) was heated in phenyl ethyl ether employing the latter in a concentration of about 20 weight percent of the total weight of the latter and the phenyl prepolymer. The heating was conducted at a temperature of about 250° C. for 2 hours during which time 27 percent of the phenyl ethyl ether was steadily removed from the reaction mixture. After recovering the phenylpolysiloxane polymer in the manner described in Example 1, it was found that the intrinsic viscosity of this composition was about 5.5, and the polymer was soluble in benzene but infusible at 250–350° C.

EXAMPLE 10

The following example illustrates the ability to use various solvents in the heat treatment of the prepolymer with the alkaline rearrangement catalyst. The procedure in this particular instance for evaluating these various solvents was a modification of the procedures employed in the preceding examples. More particularly, 50 parts of the phenylpolysiloxane prepolymer described in Example 4 (which contained 0.078% KOH, by weight, thereof) was mixed with varying amounts of different solvents. The mixture of ingredients was placed in a glass reaction vessel, evacuated to 0.2 mm. Hg, sealed and heated at about 250° C. for varying lengths of time. Thereafter, each reaction product was isolated similarly as was done in Example 1, and the intrinsic viscosity of each polymer determined. The following Table VI shows the particular solvent used, the parts of solvent employed with each 50 parts of prepolymer, the time of heating at 250° C. and the intrinsic viscosities of the polymers thus obtained:

Table VI

| Sample No. | Solvent | Approx. parts solvent | Time hours | Intrinsic viscosity |
|---|---|---|---|---|
| 19 | Diphenyl ether | 1.6 | 3.5 | 0.90 |
| 20 | ......do...... | 2.2 | 3.0 | 1.05 |
| 21 | ......do...... | 3.8 | 3.5 | 1.30 |
| 22 | ......do...... | 17.2 | 3.5 | 0.44 |
| 23 | ......do...... | 53.8 | 3.5 | 0.07 |
| 24 | Diphenyl | 12.0 | 2 | 1.13 |
| 25 | ......do...... | 20.0 | 2 | 0.98 |
| 26 | ......do...... | 40.0 | 2 | <0.1 |
| 27 | Diphenylmethane | 12 | 2 | 0.55 |
| 28 | ......do...... | 12 | 12 | 0.54 |
| 29 | ......do...... | 100 | 2 | <0.1 |
| 30 | Phenylethyl ether | 3.9 | 2 | 1.08 |
| 31 | ......do...... | 7.7 | 2 | 1.68 |
| 32 | ......do...... | 11.6 | 2 | 2.25 |
| 33 | ......do...... | 15.5 | 2 | 2.25 |
| 34 | ......do...... | 29.0 | 2 | 0.1 |
| 35 | Phenylmethyl ether | 10 | 2 | 1.48 |
| 36 | ......do...... | 20 | 2 | 2.65 |
| 37 | Benzonitrile | 10 | 2 | 2.56 |
| 38 | ......do...... | 12 | 2 | 2.05 |
| 39 | ......do...... | 30 | 2 | 0.1 |
| 40 | Mesitylene | 10.4 | 2 | 2.56 |
| 41 | ......do...... | 17.3 | 2 | 2.0 |
| 42 | Hydronaphthalene (decalin) | 10.6 | 2 | 1.26 |
| 43 | Phenylcyclohexane | 11.3 | 2 | 1.20 |
| 44 | ......do...... | 14.2 | 2 | 0.91 |
| 45 | ......do...... | 37.7 | 2 | 0.1 |
| 46 | 1,2-Diphenoxyethane | 12.0 | 2 | 1.45 |
| 47 | Meta-dimethoxybenzene | 10.6 | 2 | 2.37 |

It will be apparent to those skilled in the art that in addition to the aryl polysiloxanes prepared in the preceding examples, other aryl homoprepolymers or other aryl precopolymers employing the many other copolymerizable siloxy units of the type previously cited, may be used without departing from the scope of the invention. The solvents employed may also be varied and the concentrations of the solvent and the prepolymers may be varied within the limits recited previously, namely, up to about 30 weight percent of the solvent, based on the total weight of the latter and the prepolymer. Other alkaline rearrangement catalysts may be used, as well as varying concentrations of the latter.

The compositions of the present invention have many uses. These compositions may be dissolved in solvents (in solids concentrations of from about 0.5 to 50 weight percent), for instance, benzene, and used to coat metallic conductors, to provide heat resistant insulation possessing good electrical properties. The accompanying drawing shows a single figure composed of a metallic core 1 (e.g., copper, aluminum, brass, etc.), and an outer insulation 2 comprising our soluble organopolysiloxanes of intrinsic viscosity of 0.4 or higher.

Alternatively, solutions of organopolysiloxanes can be cast on flat surfaces and the solvent evaporated to yield cohesive films which exhibit unusual heat resistance. These films can be used for many high-temperature applications, for example, as slot liners and as end turn winding insulation in motors. In one instance, a phenylpolysiloxane composition having an intrinsic viscosity of about 2.5 was dissolved in benzene and an electrical copper conductor was passed through the solution and thereafter heated at a temperature of about 100 to 150° C. to volatilize the solvent. This resulted in deposition of a smooth, cohesive, insulating, heat resistant film which can be heated at temperatures of from 250 to 300° C. in air for long periods of time without evidence of deterioration of the insulating film.

Although many of the polymers of the present invention are substantially infusible at elevated temperatures of about 275 to 350° C., and even higher, it is possible to mix the latter with from 10 to 50%, by weight, thereof of a phenylpolysiloxane having the formula $$(C_6H_5SiO_{1.5})_{12}$$

more particularly disclosed and claimed in the copending application of John F. Brown, Jr., Serial No. 788,067, filed concurrently herewith and assigned to the same assignee as the present invention, now U.S. Patent 3,000,858, issued September 19, 1961. The presence of this latter phenylsilsesquioxane permits fabrication of articles from the higher polymeric compositions with intrinsic viscosities of 0.4 and higher by conventional pressing or molding procedures at temperatures of around 250° to 450° C. The phenylsilsesquioxane present in the high molecular weight polymers, in addition to contributing to its function as a plasticizer, is converted to a higher molecular weight material by the heat treatment, thus becoming part of a final homogeneous polymeric structure.

Solutions of our compositions may be applied to various textiles, particularly inorganic fibrous materials, to render the latter heat-resistant when the solvent is removed. Solutions of our claimed compositions can be applied to adjacent surfaces, the treated surfaces pressed together, and heated to volatilize the solvent and to form a strong, heat resistant bond between the adhered surfaces.

Various fillers may be added to our compositions of intrinsic viscosity of 0.4 or higher, for instance, finely divided silicas (e.g., fume silica, silica aerogel, precipitated silica, etc.), carbon black, titanium dioxide, iron oxide, metallic pigments (for instance, finely divided aluminum powder) etc. Such pigments which may range in an amount equal to from about 0.5 to 50 percent, by weight, based on the total weight of the latter, and the polymeric compositions in which they are incorporated, are advantageously added to a solution of our polymeric compositions, and formed into, for instance, a dispersion which can be used for dipping or coating applications.

The incorporation of suitable plasticizers such as, for instance, high temperature solvents for the heat equilibrated composition, in amounts ranging from about 1 to 25 percent, by weight, of the total mass, is not precluded. Various dyes and pigments may also be used where applications recommend the incorporation of such materials.

High temperature laminates may be prepared by dipping various organic and preferably inorganic porous materials such as glass wool, glass cloth, asbestos cloth, polyethylene terephthalate film, etc., in solutions of our compositions, layers of the coated and/or impregnated materials superposed upon each other and pressed at elevated temperatures of the order of about 200 to 350° C. at pressures ranging, for instance, from about 5 to 5,000 p.s.i. Such laminates may be in the form of panels used for electrical insulation, insulating tapes, etc., and may also be formed and used as nose cones for rockets and other projectiles which are subjected to high temperatures at supersonic speeds. Because of the resistance to temperature exhibited by our compositions, one can mold canopies of these materials (with or without reinforcing structures) used on jet airplanes which are employed to protect the pilot when travelling at high speeds at which the friction of air causes excessive increases in temperature on the surface of the canopy, thus rendering useless such materials ordinarily employed for canopy purposes as, for instance, polymethylmethacrylate.

Mufflers and tail pipes of automobiles may be coated inside and out with solutions of our compositions and the solvent evaporated to leave behind a heat resistant and corrosion resistant film which can increase the life of these appendages of automobiles. In addition, solutions of these compositions can be applied to ovens in ranges, the solvent evaporated to give, again, a heat-resistant surface which will also minimize the adhesion of many food stuffs which may be inadvertently spilled on or come in contact with the treated oven surfaces.

What we claim as new and desire to secure by Letters Patent of the United States is:

1. A composition of matter comprising a benzene-soluble organopolysiloxane having an intrinsic viscosity in benzene when measured at 25° C. of at least 0.4 deciliter per gram, said organopolysiloxane being composed of from 90 to 100 mol percent of organosiloxy units of the formula $$RSiO_{3/2}$$

any remaining organosiloxy units being selected from the class consisting of organosiloxy units of the formula $$R'R''SiO, R'[CN-(CH_2)_m]SiO, R'''SiO_{3/2}$$

and $$CN(CH_2)_mSiO_{3/2}$$

where R is an aryl radical, R' and R'' are selected from the class consisting of aryl radicals, alkyl radicals, and alkenyl radicals, R''' is a lower alkyl radical of from 1 to 4 carbon atoms, and $m$ is a whole number equal to from 2 to 4, inclusive, the said organopolysiloxane containing siloxy units of the formula $$\begin{array}{c} R \\ | \\ -Si-O- \\ | \\ O \\ | \\ -Si-O- \\ | \\ R \end{array}$$

directly connected in linear unbranched arrangement, where R has the meaning above.

2. A benzene-soluble organopolysiloxane composition having an intrinsic viscosity in benzene at 25° C. of at least 0.4 deciliter per gram composed of from 90 to 100 mol percent of organsiloxy units of the formula $$C_6H_5SiO_{3/2}$$

any remaining organosiloxy units having the formula $$(CH_3)_2SiO$$

the said organopolysiloxane composition containing siloxy units of the formula $$\begin{array}{c} C_6H_5 \\ | \\ -Si-O- \\ | \\ O \\ | \\ -Si-O- \\ | \\ C_6H_5 \end{array}$$

directly connected in linear unbranched arrangement.

3. A benzene-soluble organopolysiloxane composition having an intrinsic viscosity in benzene at 25° C. of at least 0.4 deciliter per gram composed of from 90 to 100 mol percent of organosiloxy units of the formula $$C_6H_5SiO_{3/2}$$

any remaining organosiloxy units having the formula $$(C_6H_5)_2SiO$$

the said organopolysiloxane composition containing siloxy units of the formula

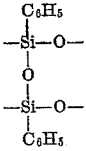

directly connected in linear unbranched arrangement.

4. A benzene-soluble organopolysiloxane composition having an intrinsic viscosity in benzene at 25° C. of at least 0.4 deciliter per gram composed of from 90 to 100 mol percent of organosiloxy units of the formula $$C_6H_5SiO_{3/2}$$

any remaining organosiloxy units having the formula $$(CH_3)(CNCH_2CH_2)SiO$$

the said organopolysiloxane composition containing siloxy units of the formula

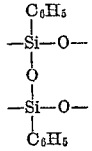

directly connected in linear unbranched arrangement.

5. A benzene-soluble organopolysiloxane composition having an intrinsic viscosity in benzene at 25° C. of at least 0.4 deciliter per gram composed of from 90 to 100 mol percent of organosiloxy units of the formula $$C_6H_5SiO_{3/2}$$

any remaining organosiloxy units having the formula $$CH_3SiO_{3/2}$$

the said organopolysiloxane composition containing siloxy units of the formula

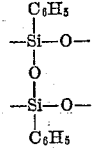

directly connected in linear unbranched arrangement.

6. A benzene-soluble organopolysiloxane composition having an intrinsic viscosity in benzene at 25° C. of at least 0.4 deciliter per gram composed of from 90 to 100 mol percent of organosiloxy units of the formula $$C_6H_5SiO_{3/2}$$

any remaining organosiloxy units of the organopolysiloxane being selected from the class consisting of organosiloxy groups of the formula $$(C_6H_5)_2SiO$$

and $$(CH_3)_2SiO$$

the said organopolysiloxane composition containing siloxy units of the formula

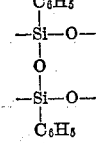

directly connected in linear unbranched arrangement.

7. A benzene-soluble organopolysiloxane composition containing an average of one phenyl radical per silicon atom as phenylsiloxy units of the formula $C_6H_5SiO_{3/2}$, said composition having an intrinsic viscosity in benzene at 25° C. of at least 0.4 deciliter per gram, the said organopolysiloxane composition containing siloxy units of the formula

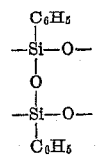

directly connected in linear unbranched arrangement.

8. A composition of matter comprising (a) the composition described in claim 1, and (b) a solvent for (a).

9. A composition of matter comprising an aromatic solvent and the composition of claim 2.

10. A composition of matter comprising an aromatic solvent and the composition of claim 3.

11. A composition of matter comprising an aromatic solvent and the composition of claim 4.

12. A composition of matter comprising an aromatic solvent and the composition of claim 5.

13. A composition of matter comprising an aromatic solvent and the composition of claim 6.

14. A composition of matter comprising an aromatic solvent and the composition of claim 7.

15. An insulated conductor composed of a metallic core and an outer insulating film comprising the composition of claim 1.

16. An insulated conductor comprising a metallic conducting core and an outer insulation comprising the organopolysiloxane composition of claim 7.

17. The process for increasing the intrinsic viscosity of an organopolysiloxane prepolymer which comprises heating, at a temperature effective to convert the prepolymer to the higher intrinsic viscosity, an organopolysiloxane prepolymer composed of from 90 to 100 mol percent of organosiloxy units of the formula $$RSiO_{3/2}$$

any remaining organosiloxy units of the organopolysiloxane being selected from the class consisting of organosiloxy units of the formula $$R'R''SiO, R'[CN-(CH_2)_m]SiO, R'''SiO_{3/2}$$

and $$CN(CH_2)_mSiO_{3/2}$$

where R is an aryl radical, R' and R'' are selected from the class consisting of aryl radicals, alkyl radicals, and alkenyl radicals, R''' is a lower alkyl radical, and m is a whole number equal to from 2 to 4, in the presence of a solvent for the organopolysiloxane prepolymer and an alkaline rearrangement catalyst, the solids concentration of the organopolysiloxane during reaction being at least 70 percent, by weight, of the total weight of the solvent and the organopolysiloxane, thereby to obtain a soluble, higher molecular weight organopolysiloxane composition having an intrinsic viscosity in benzene at 25° C. of at least 0.4 deciliter per gram.

18. The process as in claim 17 in which the prepolymer is composed of monophenylsiloxy units and the solvent is a mixture of diphenyl and diphenyl ether.

19. The process as in claim 17 in which the prepolymer is composed of monophenylsiloxy units and diphenylsiloxy units, and the solvent is phenyl ethyl ether.

20. The process as in claim 17 in which the prepolymer is composed of monophenylsiloxy units and dimethylsiloxy units, and the solvent is phenyl ethyl ether.

21. The process as in claim 17 in which the prepolymer is composed of monophenylsiloxy units and both dimethylsiloxy units and diphenylsiloxy units, and the solvent is phenyl ethyl ether.

22. The process as in claim 17 in which the prepolymer is composed of monophenylsiloxy units and methyl β-cyanoethylsiloxy units, and the solvent is benzonitrile.

23. The process as in claim 17 in which the temperature at which the prepolymer is heated is within the range of from about 200 to 325° C.

24. A self-supporting film comprising a benzene-soluble organopolysiloxane having an intrinsic viscosity in benzene when measured at 25° C. of at least 0.4 deciliter per gram, said organopolysiloxane being composed of from 90 to 100 mol percent of organosiloxy units of the formula $$RSiO_{3/2}$$

any remaining organosiloxy units being selected from the class consisting of organosiloxy units of the formula $$R'R''SiO, R'[CN\text{---}(CH_2)_m]SiO, R'''SiO_{3/2}$$

and $$CN(CH_2)_mSiO_{3/2}$$

where R is an aryl radical, R' and R'' are selected from the class consisting of aryl radicals, alkyl radicals, and alkenyl radicals, R''' is a lower alkyl radical of from 1 to 4 carbon atoms, and $m$ is a whole number equal to from 2 to 4, inclusive, the said organopolysiloxane containing siloxy units of the formula

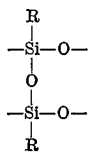

directly connected in linear unbranched arrangement, where R has the meaning above.

25. A self-supporting film comprising a benzene-soluble organopolysiloxane composition containing an average of about one phenyl radical per silicon atom as phenyl siloxy units of the formula $C_6H_5SiO_{3/2}$, said composition having an intrinsic viscosity in benzene at 25° C. of at least 0.4 deciliter per gram, and said organopolysiloxane composition containing siloxy units of the formula

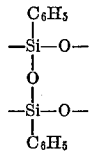

directly connected in linear unbranched arrangement.

References Cited in the file of this patent

UNITED STATES PATENTS

| | | |
|---|---|---|
| 2,465,188 | Barry et al. | Mar. 22, 1949 |
| 2,482,276 | Hyde et al. | Sept. 20, 1949 |
| 2,610,169 | Hyde et al. | Sept. 9, 1952 |

OTHER REFERENCES

Barry et al., J. Am. Chem. Soc., vol. 77, pp. 4248–4252 (1955).